US012755317B1

(12) United States Patent
Hiatt et al.

(10) Patent No.: US 12,755,317 B1
(45) Date of Patent: Oct. 6, 2026

(54) DYNAMIC, EFFICIENT, AND CONTINUOUS GENERATION AND DISSEMINATION OF IMPLIED DISPERSION INDEX VALUES

(71) Applicant: Cboe Exchange, Inc., Chicago, IL (US)

(72) Inventors: John Hiatt, Woodridge, IL (US); Parth Shah, Chicago, IL (US); Daniel Kipnis, Chicago, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 19/172,322

(22) Filed: Apr. 7, 2025

Related U.S. Application Data

(63) Continuation of application No. 17/942,940, filed on Sep. 12, 2022, now abandoned.

(60) Provisional application No. 63/242,981, filed on Sep. 10, 2021.

(51) Int. Cl.
*G06Q 40/00* (2023.01)
*G06Q 40/04* (2012.01)

(52) U.S. Cl.
CPC .................................... *G06Q 40/04* (2013.01)

(58) Field of Classification Search
CPC ...................................................... G06Q 40/04
See application file for complete search history.

(56) References Cited

U.S. PATENT DOCUMENTS

| | | | | |
|---|---|---|---|---|
| 8,606,682 B1 * | 12/2013 | Chang | G06Q 40/00 | 705/37 |
| 12,236,483 B1 | 2/2025 | Hiatt | | |
| 2007/0282758 A1 * | 12/2007 | Vischer | G06Q 40/04 | 705/36 R |
| 2008/0120250 A1 * | 5/2008 | Hiatt, Jr. | G06Q 40/04 | 709/202 |
| 2012/0072369 A1 * | 3/2012 | Bouchey | G06Q 40/04 | 705/36 R |
| 2014/0201055 A1 * | 7/2014 | Shalen | G06Q 40/04 | 705/37 |

(Continued)

OTHER PUBLICATIONS

Schneider, L., & Stübinger, J. (2020). Dispersion Trading Based on the Explanatory Power of S&P 500 Stock Returns. Mathematics, 8(9), 1627. https://doi.org/10.3390/math8091627 (Year: 2020).*

(Continued)

*Primary Examiner* — Mark H Gaw
(74) *Attorney, Agent, or Firm* — Fish & Richardson P.C.

(57) ABSTRACT

An exchange computer system configured to continuously, securely, dynamically, and efficiently generate and disseminate implied dispersion index values is described. The exchange computer system may include at least one communication interface that is configured to receive, via a computer network, data related to a stock market index, data related to a stock market index option, and data related to a plurality of stock options. The exchange computer system may further include at least one non-transitory computer-readable medium configured to store data received over particular periods of time, and an index engine including at least one hardware processor that is configured to continuously generate and disseminate implied dispersion index values for display on a plurality of user computing devices that are connected via the computer network, and that are configured to facilitate trading of financial instruments related to the implied dispersion index via a graphical user interface.

20 Claims, 7 Drawing Sheets

(56) References Cited

U.S. PATENT DOCUMENTS

2020/0065900 A1 * 2/2020 Wiesner ................ G06Q 40/04

OTHER PUBLICATIONS

Driessen et al., "Option-Impiled Correlations and the Price of Correlation Risk," SSRN Electronic Journal, Jul. 2013, 48 pages.
Driessen et al., "The Price of Correlation Risk: Evidence from Equity Options," SSRN Electronic Journal, May 2009, 64(3):1377-1409.
Hardle et al., "Implied basket correlation dynamics," Statistics & Risk Modeling, 2016, 33(1-2), 36 pages.
Linders et al., "A framework for robust measurement of implied correlations," Journal of Computational and Applied Mathematics, Dec. 2014, 271:39-52.
Markowitz, "Portfolio Selection," The Journal of Finance, Mar. 1952, 7(1):77-91.
No Author Listed, "Cboe Implied Correlation Index," Cboe, available on or before Sep. 10, 2021, 10 pages.
No Author Listed, "Cboe Implied Correlation Index," Cboe, Presentation, available on or before Sep. 10, 2021, 18 pages.
No Author Listed, "Cboe VIX Implied Correlation—White Paper," Cboe, 2021, 10 pages.
No Author Listed, "Factsheet: Cboe Implied Correlation Index," Cboe, available on or before Sep. 10, 2021, 6 pages.

* cited by examiner

DYNAMIC, EFFICIENT, AND CONTINUOUS GENERATION AND DISSEMINATION OF IMPLIED DISPERSION INDEX VALUES

CROSS-REFERENCE TO RELATED APPLICATION

This application is a continuation of U.S. application Ser. No. 17/942,940, filed Sep. 12, 2022, which claims the benefit of U.S. Provisional Patent Application No. 63/242,981 filed Sep. 10, 2021, which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO).

SUMMARY

In an electronic or hybrid exchange environment, many thousands of transactions are executed each second, and unforeseen events occur frequently. Many market participants rely on intelligence derived from market data to inform their decisions and actions, but individual participants lack the technological means to continuously monitor the vast amount of data generated each second through trading activity. An exchange computer system with sufficient bandwidth and processing resources can, however, translate the data flowing through it and available from other networked sources into actionable intelligence that connected users can rely upon.

For example, and as described in more detail within the following disclosure, an exchange computer system can be implemented in a manner enabling it to dynamically, efficiently, and continuously generate an implied dispersion index based on vast amounts of information continuously received through a computer network, and further enabling it to efficiently and continuously disseminate associated values through that network to connected computing devices in real-time, as the values are updated.

Continuously updating and disseminating the values to a plurality of connected computing devices based on data received by the exchange computer system in real-time enables the users associated with those devices to rapidly take responsive actions that otherwise would have been unavailable to them, and to implement complex strategies involving financial instruments based on the implied dispersion index for which the values are generated.

For example, the exchange computer system can securely transmit a series of implied dispersion index values generated based on data received over successive periods of time to connected user computing devices that are themselves configured to display the implied dispersion index values. The values may be displayed, for example, within a graphical user interface of an application that facilitates continuous real-time trading, through the exchange computer system, of financial instruments related to the implied dispersion index.

In that regard, the generated index and associated values ultimately reduce the bandwidth and computing resources required by the exchange and networked computer systems by, for example, reducing the number of orders that ultimately need to be processed in connection with strategies that can be more elegantly executed with index-based financial instruments.

Further, processing the data required to generate the implied dispersion index and the associated values through the exchange computer system relieves other connected systems of the computational burdens involved, thereby increasing the computational efficiency of the network as a whole.

And, as explained in more detail below, the exchange computer system can be configured to generate the implied dispersion index and associated values in a computationally efficient manner by doing so on the basis of a subset of financial instruments that together provide a representative sample of the underlying market, while at the same time minimizing the processing and storage burdens involved.

Many market participants utilize market intelligence e.g., computed measures, to inform decisions and build effective trading strategies involving complex order types made available by electronic exchanges. For example, a straddle for options-based trading is a complex trading strategy that involves the purchase of a put and a call option with the same expiration date and strike price for the same financial instrument. The straddle strategy is highly indicative of the implied volatility of the financial instrument by the expiration date, e.g., fluctuations in the price of the underlying security. Large values of implied volatility of a financial instrument can demonstrate significant realized gains or losses, however, the diversification of funds (e.g., such as those found in a stock market index) can reduce the impact of significant loss.

Due to the lack of accurate representation of the contribution of the implied volatilities of multiple component stocks in a stock market index to the overall stock market index performance, market participants generally have few available trading strategies reliant on diverse, long dispersion methods of trading. Issues in identifying the source of implied volatilities of stock market indexes arise from the possibility that the volatility of stock market indexes can be driven by the individual volatilities of the component stocks, as well as the correlation of component stock price returns. As an example, the implied volatility of the stock market index option can rise or fall without a corresponding shift in the implied volatilities of the component stock options.

As described in more detail within this application, an exchange computer system can be implemented in a manner allowing it to dynamically, efficiently, and continuously generate an implied dispersion index based on vast amounts of information received through a computer network, and to efficiently and continuously disseminate associated values through that network to connected computing devices in real-time, as the values are updated. An implied dispersion index value may, e.g., provide an options-based measure (e.g., to describe market performance) of the relative spread between implied and realized correlation of a stock market index (e.g., Standard and Poor's 500 Index), where the stock market index consists of multiple component stocks. The implied dispersion index facilitates long dispersion strategies (e.g., benefitting from increased portfolio diversification) for market participants, corresponding to decreases in the stock market index implied volatilities and increases in the component stock implied volatilities.

An implied dispersion index also provides market participants an improved ability to perform dispersion trades, by selling at-the-money (e.g., the strike price for the financial instrument is identical to the market price) options straddles (e.g., purchasing a put and call options with similar strike prices and expiration dates) for the stock market index and simultaneously buying at-the-money options of corresponding component stocks in the stock market index. The implied dispersion index provides additional market intelligence to perform these trades by executing the purchase of the component stock options on a weighted basis, with weights of the component stock options representing the contribution of the implied volatility of the corresponding component stock options with respect to the stock market index option. A dispersion trade (e.g., a trade performed on the implied dispersion index) facilitates advanced trading strategies for the market participant when, e.g., the implied correlation of the stock market index is high.

As an example, a high implied correlation of the stock market index may indicate a trading signal for market participants to sell stock market index options, as the premiums for the stock market index options are overvalued relative to the component stock options. Market participants may consider selling stock market index options and purchasing relatively undervalued component stock options through the implied dispersion index using a delta neutral strategy (e.g., the value of the option is relatively insensitive to price changes for the corresponding instrument of the option.) The implied dispersion index provides a greater ability for market participants to execute delta neutral strategies (e.g., balancing multiple positions with positive and negative deltas to neutralize the overall delta).

Generating an implied dispersion index provides market participants additional information to execute trading strategies. The implied dispersion index provides an additional benchmark to measure the performance of a basket of stocks, including an individual market participant's portfolio, a stock market index, and multiple stock indexes. The implied dispersion index is an options-based index, providing availability for market participants to execute complex orders with the additional information provided by the implied dispersion index. As an example, the implied dispersion index is effective in providing the market participant an opportunity to execute strategies such as shorting correlation of a corresponding stock market index.

The implied dispersion index provides numerous advantages to market participants including delta neutrality (e.g., defensive strategy) to allow market participant to hedge risk regardless of the direction of the realized volatility of a stock market index. The implied dispersion index also provides additional advantages compared to other indexes generated by, e.g., selecting a number of stocks based on market capitalization, price-weighting per share of stock, by sector exchange-traded funds, sector risk parity. The implied dispersion index provides an updated, accurate measure without skewing towards particular sectors, excluding less prominent types of funds, and unnecessarily introducing fees associated with higher than nominal trade turnover.

The implied dispersion index provides an advantage in selecting weights for component stock options without overweighting towards one or more sectors corresponding to component stocks. As an example, particular sectors associated with the component stocks may undergo periods of high volatility due to external factors or drastic changes (e.g., particular legislation impacts, resource limitations, breakthrough in technologies, adverse algorithmic traders) in the market. The implied dispersion index provides a representative sample (e.g., a basket of component stocks) of a stock market index (e.g., Standard and Poor's 500 Index) while minimizing the number of components used to generate the sample. An additional advantage of the selection of the representative sample of the stock market index by generating the implied dispersion index is that returns of the options corresponding to the representative sample have a high correlation with respect to the returns of the stock market index. The high correlation between returns of the stock market index being measured in the implied dispersion index, and the returns of the options, provides an intelligible, equitable, and transparent trading signal to the market participants.

An additional advantage of the implied dispersion index includes the selection process for representing a stock market index when generating the implied dispersion index. For example, providing market intelligence by estimating measures of the stock market index is a computationally burdensome process when based on financial instruments corresponding to all of the component stocks in the stock market index. The generation of the implied dispersion index includes selecting options corresponding to some, but not necessarily all, of the component stocks in the stock market index, thereby expediting the processing and dissemination of implied dispersion index data. As an example, the construction of some existing market indexes are limited by back calculating based on historical data of the stock market index being measured. The implied dispersion index can, however, be rapidly and readily generated and then disseminated on a continuous basis to external devices.

Further, in addition to providing real-time market intelligence relating to the implied volatility of an underlying market, the implied dispersion index allows market participants to trade futures contracts, options, and other types of derivatives in combination with financial instruments based on the implied dispersion index itself.

In calculating and disseminating the implied dispersion index, an additional advantage includes a centrally located source of market intelligence related to the implied volatilities of a stock market index. For example, the implied dispersion index provides a high quality representation (e.g., measurement, estimate) of the underlying market, and thereby provides users of devices connected to the exchange computer system with an efficient means of analyzing and executing on trading strategies informed by implied volatility data. For example, some users may heavily rely on real-time, readily accessible data to efficiently execute numerous (e.g., high-volume) trades. Continuously generated and disseminated implied dispersion index values can facilitate these strategies.

The disclosure that follows relates to technology enabling market participants receive market intelligence and submit financial instrument transaction orders related to an implied dispersion index. The implied dispersion index by the disclosed technology can enhance the usefulness of certain trading strategies to market participants, by offering an immediate, highly representative, and effective estimate of implied dispersion of the stock market index. For example, a user can receive disseminated data about the implied dispersion of the stock market index in the form of implied dispersion index values, enter an order for a financial instrument based on the implied dispersion index, and have that order facilitated through the exchange computer system. As another example, a user in possession of a financial instrument based on the implied dispersion index can receive a strip of options corresponding to the component stock options and stock market index options from which the implied dispersion index was generated, upon that instrument's expiry.

In one aspect, an exchange computer system for continuously, securely, dynamically, and efficiently generating and disseminating implied dispersion values includes at least one communication interface configured to receive data related to a stock market index, data related to a stock market index option, and data related to a plurality of stock options, from one or more remote computing devices via a computer network. The plurality of stock options correspond to a plurality of stocks traded on a stock market corresponding to the stock market index, and the stock market index option corresponds to the stock market index.

The exchange computer system may further include at least one non-transitory computer-readable medium configured to receive an indicator of receiving data for a particular period of time and to store, in response to receiving the indicator, the data. The data may include data related to the stock market index, the stock market index option, and the plurality of stock options.

The exchange computer system may further includes an index engine with at least one hardware processor coupled with the at least one non-transitory computer-readable medium, which may be further configured to store computer-executable instructions that, when executed by the at least one hardware processor, cause the index engine to perform several processes.

These processes may include automatically selecting a subset of component stock options to provide a representative sample of the stock market index while minimizing a number of component stock options, thereby reducing processing overhead associated with generating an implied dispersion index value for the particular period of time. The index engine processes may also include determining a weighting value and a component stock option volatility for each of the plurality of component stock options, and a stock market index option volatility. The index engine processes may also include generating, for the particular period of time, an implied dispersion index value based on the weighting value and component stock option volatility of the component stock options, and the stock market index option volatility, and securely transmitting the implied dispersion index value to a plurality of user devices connected to the exchange computer system via the computer network. The user devices may be configured to display the implied dispersion index value within a graphical user interface of an application that facilitates continuous real-time trading, through the exchange computer system, of financial instruments related to an implied dispersion index for which the implied dispersion index value was generated.

The exchange computer system may include computer-executable instructions that when executed by the at least one hardware processor, cause the index engine to perform further processes including receiving a request for the implied dispersion index value from at least one of the plurality of user computing devices through the at least one communication interface. The further processes performed by the index engine may also include accessing metadata associated with the plurality of user computing devices over at least one communication pathway within the computer network, responsive to receiving the request for the implied dispersion index value. The further processed performed by the index engine may also include determining that the metadata meets a predetermined threshold, wherein the implied dispersion index value is securely transmitted to the plurality of user computing devices responsive to determining that the metadata meets a predetermined threshold. Determining that the metadata meeting a predetermined threshold may be based at least in part on one or more attributes of the plurality of user computing devices that are indicated by the metadata.

The exchange computer system may securely transmit the implied dispersion index value to the plurality of user computing devices based at least in part on a distribution list, and the at least one communication interface may include a transceiver having one or more input/output ports connected to the computer network.

The exchange computer system's at least one non-transitory computer-readable medium may include a memory device configured to receive, tag, store, and provide volatility data from the computer network through the at least one communication interface. The memory device may tag the volatility data according to a first time period tag indicative of a first particular time period for which the volatility data is stored, and may provide the volatility data and the first time period tag to the at least one hardware processor, which may be further configured to determine the component stock option volatility for each of the plurality of component stock options for the first particular time period based at least in part on the volatility data provided by the memory device.

The memory device may be further configured to receive a reset signal to remove the volatility data that is stored for the first particular time period and to delete or archive the volatility data for the first particular time period in response to receiving the reset signal. The memory device may be further configured to receive second volatility data from the computer network through the at least one communication interface and to tag the second volatility data according to a second time period tag indicative of a second particular time period for which the second volatility data is stored. The memory device may be further configured to store the second volatility data and the second time period tag, and the at least one hardware processor of the exchange computer system may be configured to determine the component stock option volatility for each of the plurality of component stock options for the second particular time period based at least in part on the second volatility data provided by the memory device.

The exchange computer system's at least one non-transitory computer-readable medium that may include a memory device partitioned into designated memory locations that are allocated based on one or more of a type of stock market index, a type of stock market index option, and a type of stock option. The data related to the stock market index, the data related to the stock market index option, and the data related to the plurality of stock options that are received through the at least one communication interface may be stored in the designated memory locations of the memory device based on a type of the stock market index indicated in the data related to the stock market index, a type of the stock market index option indicated in the data related to the stock market index option, and a type of the stock options indicated in the data related to the plurality of stock options. The data related to the stock market index may include, for each of the component stock options, a linking identifier that identifies a corresponding stock.

The exchange computer system may include generating the implied dispersion index value by accessing a log file of component stock option volatility for each of the plurality of component stock options and accessing a log file of stock market index option volatility. Generating the implied dispersion index by the exchange computer system may include securely transmitting the implied dispersion index to a plurality of user computing devices, including securely transmitting stock market index data to the plurality of user computing devices, wherein the stock market index data identifies each of the plurality of component stock options. Generating the implied dispersion index by the exchange computer system may include securely transmitting stock market index data to the plurality of user computing devices, wherein the stock market index data identifies a plurality of stocks corresponding to the plurality of component stock options.

In some implementations, the exchange computer system is a distributed computer system that may include the at least one communication interface, the at least one non-transitory computer-readable medium and the index engine. The exchange computer system also may include an order entry port that may be configured to receive, from a user computer device included in the plurality of user computing devices, an order for a financial instrument corresponding to the implied dispersion index for which the implied dispersion index value was generated, wherein data related to the order was provided by a user through the graphical user interface of the application. The exchange computer system may include an order routing system that may be configured to route the order according to a destination associated with the order and an order matching system. In some implementations, the order entry port may be configured to receive, from a user computer device included in the plurality of user computing devices, an order for a financial instrument corresponding to an implied dispersion index for which the implied dispersion index value was generated. In some implementations, the order routing system may be configured to route the order according to a destination associated with the order and the order matching system may be configured to match the order to another order based on one or more matching rules.

In one aspect, a method for securely, dynamically, and efficiently generating and disseminating an implied dispersion index value via an exchange computer system may include receiving, from one or more remote computing devices connected to the exchange computer system via a network, data related to a stock market index, data related to a stock market index option, and data related to a plurality of stock options. The plurality of stock options correspond to a plurality of stocks that are traded on a stock market corresponding to the stock market index, and the stock market index option corresponds to the stock market index. The stock market index may include one or more component stocks. The method may include automatically selecting, based on the data related to the stock market index and the data related to the plurality of stock options, a subset of component stock options. The subset of component stock options may include a plurality of component stock options that are selected such that stocks corresponding to the plurality of component stock options together provide a representative sample of the stock market index while a number of component stock options is minimized, thereby reducing processing overhead associated with generating the implied dispersion index value. The method may include determining a weighting value and a component stock option volatility for each of the plurality of component stock options, and determining a stock market index option volatility. The method may include generating an implied dispersion index value based on the weighting value for each of the plurality of component stock options, the component stock option volatility for each of the plurality of component stock options, and the stock market index option volatility. The method may include securely transmitting the implied dispersion index value to a plurality of user computing devices that are connected to the exchange computer system via the network and that are configured to display the implied dispersion index value.

The method for securely, dynamically, and efficiently generating and disseminating an implied dispersion index value may include providing an option-based measure of market expectation of relative spread between implied and realized correlation. In some implementations, the stock market index is the SPX and the stock market index option volatility is determined based on a volatility index methodology.

The method for securely, dynamically, and efficiently generating and disseminating an implied dispersion index value may include determining, for each of the plurality of component stock options, a weighted value by multiplying the weighting value corresponding to the component stock option by a square of the component stock option volatility corresponding to the component stock option. The method may include determining a sum of the weighted values and subtracting a square of the stock market index option volatility from the sum of the weighted values.

In some implementations, the plurality of component stock options are automatically selected based on market capitalization. In some implementations, the plurality of component stock options are selected such that every stock corresponding a component stock option has been listed on the stock market index for at least a threshold period of time, such that every stock corresponding to a component stock option has a liquidity metric exceeding a liquidity threshold, and such that every stock corresponding to a component stock option has a volatility between a first threshold and a second threshold.

The method for securely, dynamically, and efficiently generating and disseminating an implied dispersion index value may include receiving, from a user device included in the plurality of user computing devices that are connected to the exchange computer system via the network, data indicative of a request for entry of an order for a financial instrument corresponding to the implied dispersion index value in an order book. The method may include determining that a second order in the order book matches the order and facilitating a transaction based on the second order and the order. In some implementations, the order book is a trade at settlement order book, and wherein a transaction price of the order is determined based on a daily settlement price of the implied dispersion index value. In some implementations, the order is a market order, wherein the financial instrument corresponding to the implied dispersion index value is an implied dispersion index futures contract. The method may include receiving, from the user device, a third order, including that the order and the third order are received simultaneously. In some implementations, the order is a short order and the third order is a stock option long order. In some implementations, the order is a long order and the third order is a stock option short order.

The method for securely, dynamically, and efficiently generating and disseminating an implied dispersion index value may include the exchange computer system is a distributed computer system that may include an order entry port, an order routing system, an order matching system, and an index engine. In some implementations, the order entry port may be configured to receive the order, the order routing system may be configured to route the order according to a destination associated with the order, and the order matching system may be configured to match the order and the second order based on one or more matching rules.

In some implementations, the method for securely, dynamically, and efficiently generating and disseminating an implied dispersion index value may including settling a financial instrument corresponding to the implied dispersion index by providing an owner of the financial instrument with a strip of options corresponding to the plurality of component stock options and to the stock market index option.

In one aspect, a method for securely, dynamically, and efficiently generating and disseminating an implied dispersion index value implemented via an exchange computer system may include receiving data from one or more remote computing devices that are connected to the exchange computer system via a network. The data may include data related to a stock market index, data related to a stock market index option, and data related to a plurality of stock options. The plurality of stock options correspond to a plurality of stocks that are traded on a stock market corresponding to the stock market index, and the stock market index option corresponds to the stock market index. The method may include automatically selecting, based on the data related to the stock market index and the data related to the plurality of stock options, a subset of component stock options. The subset of component stock options may include a plurality of component stock options that are selected such that stocks corresponding to the plurality of component stock options together provide a representative sample of the stock market index while a number of component stock options is minimized, thereby reducing processing overhead associated with generating the implied dispersion index value. The method may include determining a weighting value and a return for each of the plurality of component stock options. The method may include generating the implied dispersion index value based on the weighting value of each of the plurality of component stock options and the return of each of the plurality of component stock options. The method may include securely transmitting the implied dispersion index value to a plurality of user computing devices that are connected to the exchange computer system via the network and that are configured to display the implied dispersion index value.

In some implementations, the method for securely, dynamically, and efficiently generating and disseminating an implied dispersion index value may include determining, for each of the plurality of component stock options, a weighted value by multiplying the weighting value corresponding to the component stock option by an absolute value of the return corresponding to the component stock option. The method also may include determining a sum of the weighted values, and determining, for each of the plurality of component stock options, a second weighted value by multiplying the weighting value corresponding to the component stock option by the return corresponding to the component stock option. The method may include determining a sum of the second weighted values and subtracting an absolute value of the sum of the second weighted values from the sum of the weighted values.

In some implementations, the method for securely, dynamically, and efficiently generating an implied dispersion index value may include settling a financial instrument corresponding to the implied dispersion index value by providing an owner of the financial instrument with a strip of options corresponding to the plurality of component stock options and to a TIXX index.

Certain implementations may provide various advantages. For example, the disclosed technology can be used to provide real-time, estimated market intelligence of an implied dispersion of a stock market index, thereby enabling market participants to execute previously unavailable options-based trading strategies. Additional practical applications of the disclosed technology include facilitation of derivative-type trades of the implied dispersion index, and settlement of related derivatives.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
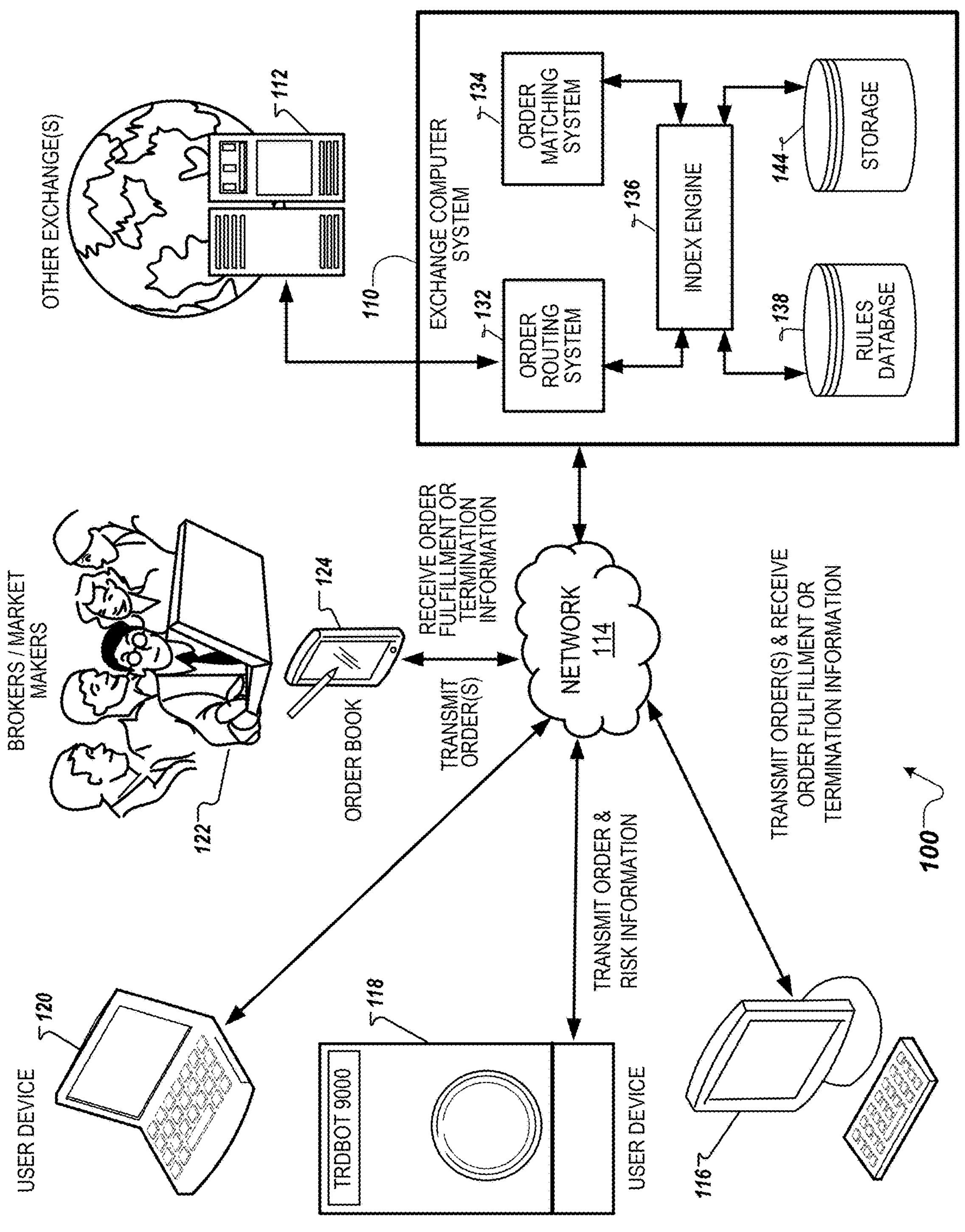
FIG. 1 is an example diagram of an exchange computer system and associated networks, devices, and users.

FIG. 1 is a diagram of an exemplary trading environment 100 for generating an implied dispersion index value that may include an exchange computer system and the associated networks, devices, and users. Generally, the term "user" may refer to any entity that interacts with the exchange computer system and/or associated networks and devices. Users may include, for example, market makers and other market professionals, brokers, institutional traders, individual traders, and automated trading systems. The diagram may include an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures contracts, or other derivatives associated with an underlying asset.

Network 114 connects the various components within the trading environment, and may be configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, an index engine 136, a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The index engine 136 may be implemented using a combination of software and hardware. The index engine 136 may, for example, be implemented as one or more hardware processors configured to execute one or more algorithms, as described in further detail below. An example configuration of an exchange computer system featuring an index engine 136 is further described in FIG. 2.

The index engine 136 may generate and disseminate an implied dispersion index value, to provide an option-based measurement of the market expectation of relative spread between implied and realized correlation of a stock market index. The index engine 136 may generate the implied dispersion index value for the Standard and Poor's 500 Index, by following processes further described in FIGS. 4-7. After generating the implied dispersion index value corresponding to the stock market index, the index engine 136 may disseminate the implied dispersion index to other exchanges (e.g., exchanges 112) and one or more user devices (e.g., user devices 116, 118, 120) by the network 114.

The exchange computer system 110 may also facilitate an order for a financial instrument corresponding to the implied dispersion index value. For example, the exchange computer system 110 may be configured to receive data from one or more user devices (e.g., user devices 116, 118, and 120) by the network 114 connected to the exchange computer system 110. The received data describes a request to enter the order for a financial instrument corresponding to the implied dispersion index value in the electronic order book 124. The implied dispersion index value generated by the index engine 136 provides additional market information (e.g., by estimating relative spread of correlation) for the stock market index, so the exchange computer system 110 may facilitate a transaction for the order. The exchange computer system 110 facilitates the transaction by determining a second order in the electronic order book 124 matches the order described in the received data. The exchange computer system 110 may utilize the ORS 132 to route the order from the received data and the OMS 134 to match the second order in the electronic order book 124 to the order.

The exchange computer system 110 may also be configured to simultaneously receive (e.g., by the network 114 and ORS 132 of the exchange computer system 110) from one or more user devices, multiple orders for a financial instrument corresponding to the implied dispersion index value.

The exchange computer system 110 receives a third order while the second order in the electronic order book 124 matches the order from the received data. The third order may be a stock option long order (e.g., the market participant holds the security) while the order from the received data is a short order (e.g., the market participant does hold the security). As another example, the third order may be a stock option short order while the order from the received data is a long order.

The electronic order book 124 may be a trade at settlement order book and the determined transaction price of the order from the received data is based on a daily settlement price of the implied dispersion index. A user, for example, may place an order for a futures contract through a trade at settlement transaction during the trading day on the implied dispersion index, at a price equal to the future's settlement price. In some examples, the order for the futures contract can be placed a specified price differential above or below the daily settlement price. Completed trade at settlement orders for the implied dispersion index are confirmed during the trading session, and the final price for the transaction of the futures contract is confirmed when the daily settlement price is established.

The order from the received data may be a market order and the financial instrument of the order corresponding to the implied dispersion index value is an implied dispersion index futures contract. In some implementations, other types of derivative contracts (e.g., forward, swaps, and options) may be traded based on the implied dispersion index. The user may purchase an implied dispersion index future and receive a strip of options upon expiration of the future. In some examples, the user may receive settlement of an options order by transferring the underlying asset of the options order to the user. In other examples, the user may receive a cash-value settlement for the options order.

In some examples, the exchange computer system 110 is a distributed computer system that includes an order entry port (e.g., by network 114), an order routing system (e.g., ORS 132), an order matching system (e.g., OMS 134), and an index engine (e.g., index engine 136). The distributed computer system may operate multiple hardware and software processes in parallel configurations. The order entry port receives the order from the data sent to the exchange computer system by a user device and the order routing system is configure to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the auction engine 136. The auction engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
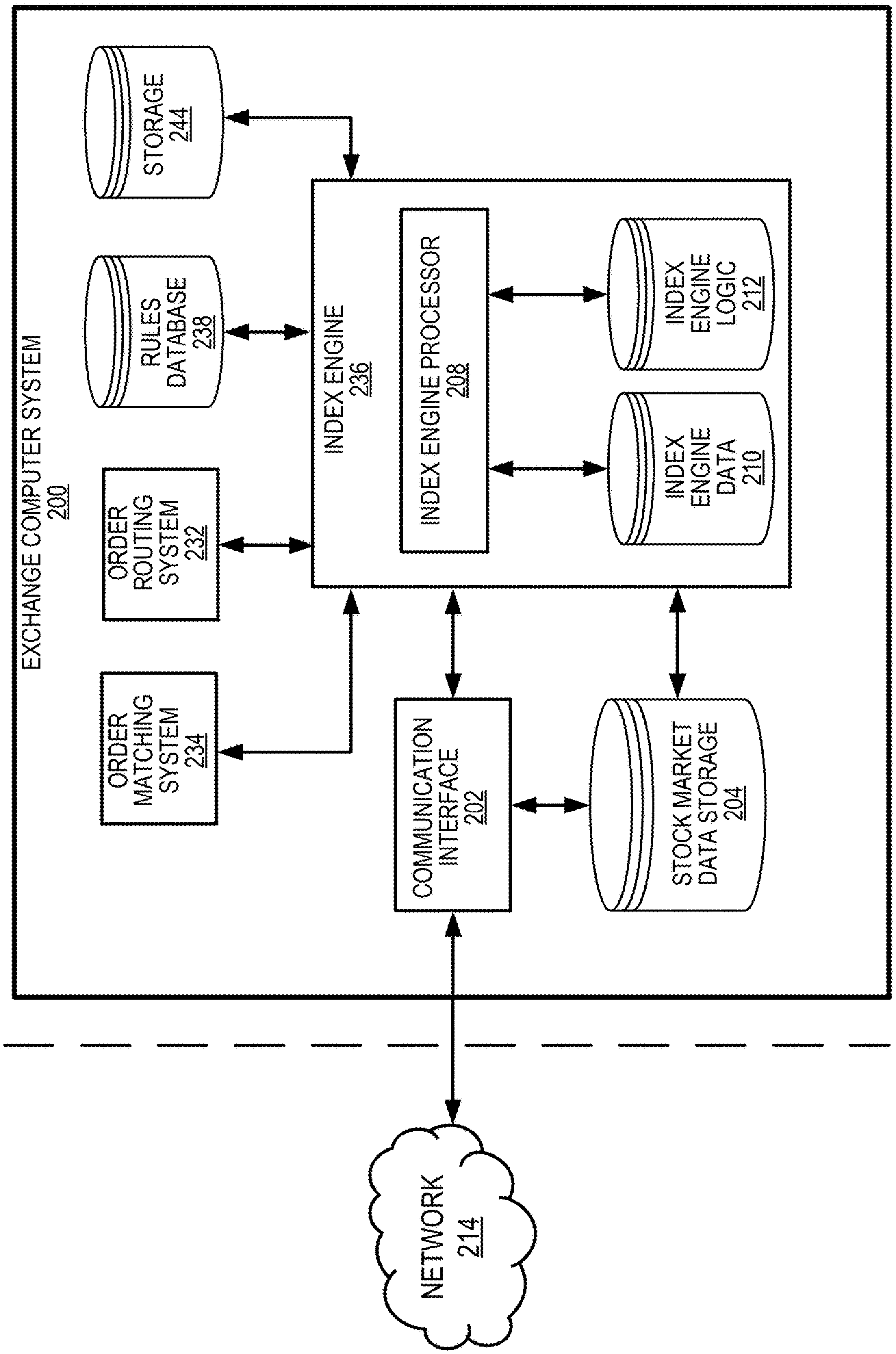
FIG. 2 is an example diagram of an exchange computer system including an index engine.

FIG. 2 is a diagram of an example exchange computer system 200 with an index engine 236 configured to generate an implied dispersion index. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a stock market data storage 204. The communication interface 202 may be communicatively linked to an index engine 236, which includes an index engine processor 208, index engine data 210, and index engine logic 212. The index engine 236 may also be communicatively linked to an ordering matching system 234, an order routing system 232, a rules database 238, and storage 244 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 214 may be a public network, such as the Internet, a private network, such as an intranet, or combinations thereof, and may utilize a variety of networking protocols now available or later developed including, but not limited to TCP/IP based networking protocols.

The index engine processor 208 may include one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. The index engine processor 208 may carry out one or more instructions using one or more arithmetic, logical, and/or input/output operations. Though index engine processor 208 is illustrated as a single component, index engine processor 208 may be integrated in whole or in part with other components of the exchange computer system 200.

Data storage e.g., stock market data storage 204 and index engine data 210, may be a main memory, a static memory, or a dynamic memory. Stock market data storage 204 and storage for index engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. In one case, stock market data storage 204 and storage for index engine data 210 may include a cache or random access memory for the index engine processor 208. Stock market data storage 204 and storage for index engine data 210 may be separate from the index engine processor 208, such as a cache memory of a processor, the system memory, or other memory. Stock market data storage 204 and storage for index engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the index engine 236 may include index engine data 210 and/or index engine logic 212. The index engine data 210 may include one or more types of data suitable for a given implementation. For example, index engine data 210 may include data (such as input datasets) that may be stored in memory. Index engine logic 212 may include, for example, machine language instructions executable by index engine 236 to carry out various functions, such as the functionality of the methods and systems described herein. In some examples, the functions, acts or tasks may be independent of the particular type of instructions sets, storage media, processor or processing strategy and may be performed by software, hardware, integrated circuits, firmware, micro-code and the like, operating alone or in combination. Processing strategies may include multiprocessing, multitasking, parallel processing and the like.

In the exchange computer system 200, the communication interface 202 may include one or more structures, and associated equipment, for receiving data from one or more sources and distributing data to a group of one or more destinations. In some examples, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in stock market data storage 204. The communication interface 202 may also be configured to communicate all or part of the input datasets to the index engine 236 once the input datasets are stored or otherwise processed. The communication interface 202 may include a transceiver having one or more input/output ports connected to the network 214 to securely transmit implied dispersion data from the index engine 236 to user computing devices.

As an example, the input datasets are stored in stock market data storage 204 may be partitioned (e.g., horizontal, vertical, functional) into designated memory locations (e.g., virtual addresses) based on qualities of the input datasets, e.g., a type of stock market index, a type of stock market index option, and a type of stock option. In some examples, the input datasets with data related to component stock options may be stored in stock market data storage 204 and include a linking identifier (e.g., address, memory mapping) to identify a corresponding stock for each of the component stock options. In some examples, the stock market data storage 204 may be configured to receive an indicator describing the operating status (e.g., receiving, clearing, storing) input datasets of the communication interface 202.

The input datasets from the communication interface 202 may include financial market data (e.g., market intelligence) corresponding to a stock market index (e.g., Standard and Poor's 500 Index) and the component stocks corresponding to the stock market index. For example, financial market data may include volatilities, interest rates, returns (e.g., historical, expected), market capitalization, sector, prices, liquidity, and other metrics related to the component stocks and stock market index. Financial market data may also include measures, estimates, and other related data for options (e.g., calls, puts), futures, and other derivatives for the stock market index and component stocks. The input datasets may also include corresponding log files to describe and store the financial market data e.g., a log file describing volatility for each component stock option. The log files may include metadata to tag or characterize data, e.g., corresponding time periods for which the data was recorded. For example, the log files may include a tag to be used for sorting or filtering the data of the log files.

Upon receiving input datasets from the communication interface 202, including data stored in the stock market data storage 204, the index engine 236 may perform further processes including receiving requests and accessing metadata. The index engine 236 may perform operations using the index engine processor 208, with instructions stored in the index engine logic 212, and data stored in index engine data 210. The data stored in index engine data 210 may include all of or a subset (e.g., filtered) of the data stored in stock market data storage 204, where the subset of the data stored in the index engine data 210 is filtered based on a specified time period. The index engine 236 may perform operations on the index engine data 210 including deleting, archiving, tagging, and resetting. The index engine 236 can utilize metadata, including log files, to process (e.g., filtering, sorting) the index engine data 210.

The index engine 236 may also access other components of the exchange computer system 200 including the order matching system 234, order routing system 232, rules database 238, and storage 244. The order matching system 234 may be configured to match an order received from the user device (e.g. user devices 116, 118, and 120) to another order based on the matching rules stored in the rules database 238. The order routing system 232 may be configured to route the order received from the user device to a destination associated with the order. The storage 244 may include additional data from the exchange computer system 200, accessed by the index engine 236 for processing.

Figure 3:
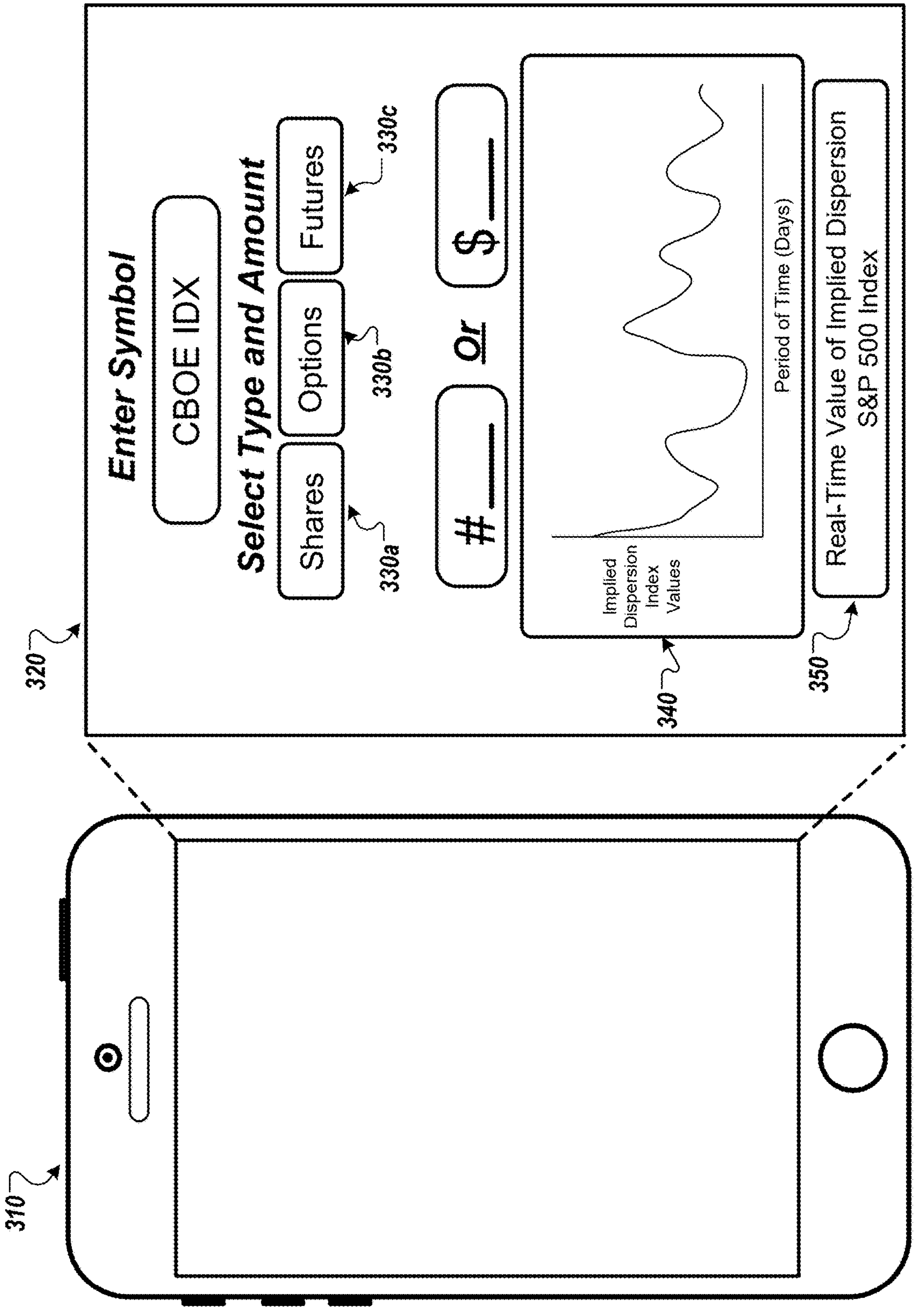
FIG. 3 is an illustration of an exemplary graphical user interface for display of implied dispersion index values and trading of financial instruments based on the implied dispersion index.

FIG. 3 is an illustration of a graphical user interface on a device 310 for displaying received implied dispersion index values and submitting one or more orders involving one or more financial instruments based on the implied dispersion index. A client device (e.g., user devices 116, 118, and 120) can display the graphical user interface after receiving implied dispersion data from the exchange computer system. A user of a device 310 can interact with a user interface panel 320 created by the device 310 after receiving implied dispersion index data (e.g., index engine data 210) from the exchange computer system by a computer network (e.g., network 214). The panel 320 can include fields that enable a user to enter a symbol (e.g., a stock or option symbol), select the type of the trade and specify an amount. As an example, the user can enter a symbol (e.g., "CBOE IDX") corresponding to the implied dispersion index to submit an order (e.g., market order, trade-at-settlement) through the device 310.

In general, various suitable types of panels 320 can be used to enter order information and additional information from a user. When a user selects a selected type 330*a*, 330*b*, 330*c*, by interacting the panel 320, the device 310 can use the implied dispersion data to provide the user with additional customizations for the order. For example, selecting "Options" 330*c* can cause the user device present the user with the ability to select "Call" or "Put" types, or a strategy type, such as a spread, involving financial instruments based on the implied dispersion index. A graph 340 of implied dispersion values for an index (e.g., from the implied dispersion data) for a period of time (e.g., 30 days) can be provided and displayed to the panel 320. A real-time value 350 of the implied dispersion index can also be provided and displayed to the panel 320. The user of the device 310 may select additional options (e.g., time windows, historical dispersion data) for the graph 340. In some examples, the real-time value 350 can be a historical value of the implied dispersion index on a particular time and/or date (e.g., month, day, and year), retrieving the implied dispersion index data (e.g., value) for the particular time and date.

Figure 4:
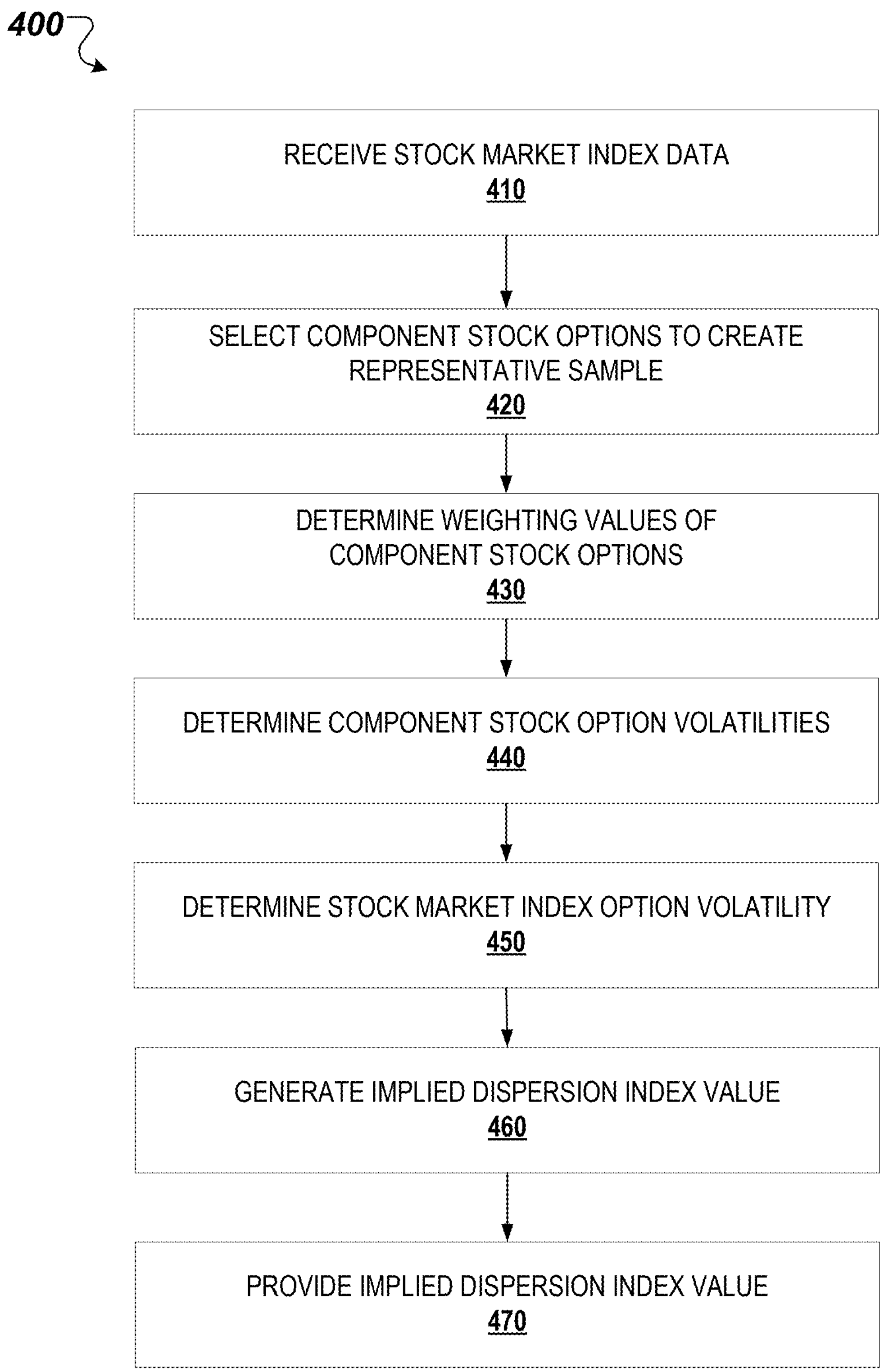
FIG. 4 is a flowchart of an example process for generating and disseminating an implied dispersion index value using variances.

FIG. 4 is a flowchart of an exemplary process 400 for generating and providing an implied dispersion index value, by using variance replication to compute implied volatilities of a stock market index option and its corresponding component stocks options. Briefly, the process 400 includes the steps of receiving data related to a stock market index (410), selecting one or more component stock options to represent the stock market index (420), determining a weighted value for each of the component stock options (430), determining a component stock option volatility for each of the component stock options (440), determining a stock market index option volatility of a stock market index option corresponding to the stock market index (450), generating the implied dispersion index value (460), and providing the implied dispersion index value (470).

The implied dispersion index value may be an option-based measure of market expected spread between implied (e.g., predicted correlation a stock market index) and realized correlation (e.g., historical correlation data of a stock market index). The spread between implied and realized correlation describes a difference between predicted and actualized correlation of the stock market index, where the correlation of the stock market index further describes a relationship between stock market index options and corresponding options of components stocks in the stock market index.

In more detail, the process 400 includes the step of receiving data related to a stock market index (410). For example, the exchange computer system 110 may receive data related to the Standard and Poor's 500 Index from a remote computing device associated with one of the brokers/market makers 122, by a network 114. In some examples, the data related to the stock market index is co-located with exchange computer system 110, but can also be provided by other exchanges 112 or by other sources over network 114. The data related to the stock market index may include classes of component stocks that make up the stock market index and market data related to the classes of component stocks (e.g., average daily volume, national best bid and offer, strike price, premiums, contract sizes, expiration dates).

The process 400 includes the step of selecting one or more component stock options related to stocks traded in the underlying market related to the stock market index, so as to provide a representative sample of the stock market index (420), while minimizing processing burdens involved in generating the implied dispersion index. The component stocks corresponding to the component stock options may be selected based on market capitalization of the component stock relative to the stock market index (e.g., large-cap, small-cap). In some examples, the component stocks corresponding to the component stock options may be selected based on multiple market conditions and characteristics, such as an amount of time the component stock has been listed on the stock market index and liquidity metrics (e.g., working capital ratio, average daily volume, bid-ask spread). The component stocks corresponding to the component stock options can also be selected based on the volatility of the component stock (e.g., above or below a threshold value, between two threshold values) in the stock market index. Additionally, the exchange computer system 110 can implement rules from database 138 including selecting stocks based on liquidity class, availability of liquid call-put options pairs, and exclusion of pre-specified restricted securities. In some examples, the database 138 includes algorithms to select the component stocks for corresponding component stock options.

The process 400 includes the step of determining a weighted value for each of the component stock options (430). The weighted value for each of the component stock options can be a value determined by the index engine 136 of the exchange computer system 110. Further discussion of the index engine 136 determining the weighted value corresponding to each component stock option is referenced in FIG. 5, but other example methods may be utilized for computing weighted values. The weighted value of each of the component stock options describes the contribution (e.g., a representation) of each component stock option in the makeup of the implied dispersion index.

The process 400 includes the step of determining a volatility for each component stock option of the stock market index (440). The volatility determined for each component stock option may include processing historical, realized volatilities for each component stock in the stock market index. In some examples, processing volatilities may require processing data received by the exchange computer system 110 in step 410 over a historical period of time by the index engine 136 to compute one or more values for implied (e.g., predicted) volatility of the component stock option.

The process 400 includes the step of determining a volatility of a stock market index option corresponding to the stock market index (450). The volatility determined for the stock market index option (e.g., SPX options for the Standard and Poor's 500 Index) may include processing historical, realized volatilities of the stock market index (e.g., Standard and Poor's 500 Index) by the received data from the exchange computer system 110 in step 410. One or more values for implied (e.g., predicted) volatility may be computed using market information and conditions. For example, the index engine 136 can process the stock market index option and using its market price, underlying stock price, time-to-expiration (e.g., expiration date), and risk-free interest rate of return of the market (e.g., treasury bonds) to determine an implied volatility for the stock market index option.

A volatility index (e.g., VIX) methodology may also be used to compute the volatility of stock market index option (e.g., using the midpoint of stock market index option bid/ask quotes). For example, rules may be employed (e.g., from the database 138) to calculate the volatility of the stock market index option. The rules may include utilizing the time to expiration and the risk-free interest rate to expiration of the available options for the stock market index. Strike price information about the options for the stock market index (e.g., option-implied forward price, first strike price immediately below or including the option forward price, corresponding midpoints of the bid-ask spread of each option, and interval between strike prices) may also be used to compute the volatility of the stock market index option.

In some examples, the options utilized in a VIX index value calculation may be filtered (e.g., by a filtering methodology) based on a threshold level and threshold period. The threshold level may describe a value (e.g., volatility points) and threshold period a time period (e.g., minutes) to exclude options in the VIX index that may not accurately describe the implied volatility of the stock market index (e.g., Standard and Poor's 500 Index).

The process 400 includes the step of generating the implied dispersion index value (460). The implied dispersion index value may be generated based on the weighted value determined for each of the component stock options in step 430, the component stock option volatility determined for each of the component stock options in step 440, and the stock market index option volatility based on the stock market index option in step 450. The index engine 136 of the exchange computer system 110 determines the implied dispersion index value. Further discussion of the index engine 136 determining implied dispersion index value by variance replication is referenced in FIG. 5, but other example techniques (e.g., absolute returns) may be used for generating the implied dispersion index value.

The process 400 includes the step of providing the implied dispersion index value (470). For example, the implied dispersion index value may be provided by the exchange computer system 110 to user devices 116, 118, and 120, brokers/market makers 122, and other exchanges 112 over the network 114 . . . . The implied dispersion index value may be disseminated to one or more remotely located device (e.g., user devices 116, 118, and 120) or co-located devices e.g., a graphical user interface on a display (e.g., panel 320 on user device 310 in FIG. 3) by the network 114 from the exchange computer system 110.

Figure 5:
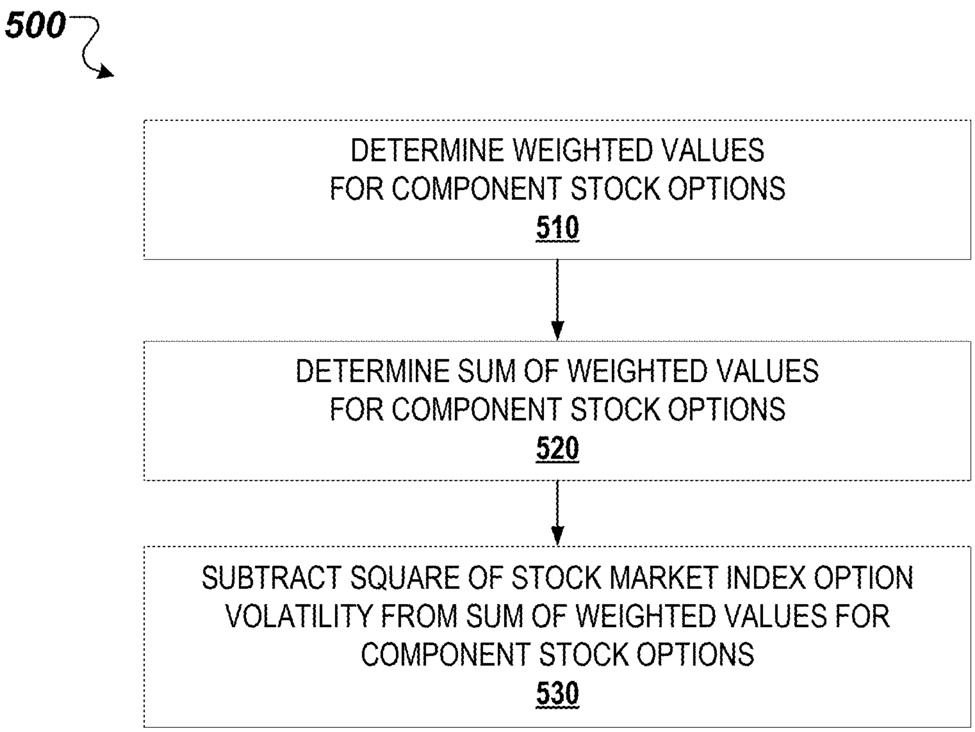
FIG. 5 is a flowchart of an additional example process for generating an implied dispersion index value using variances.

FIG. 5 is a flowchart of an exemplary process 500 for computing an implied dispersion index value for a stock market index, using variance replication to compute implied volatilities of options for a stock market index and its corresponding component stocks. Briefly, the process 500 includes the steps of determining a weighted value for each of the component stock options (510), determining a sum of the weighted values for the component stock options (520), and subtracting a square of the volatility for the stock market index from the sum of the weighted values for the component stock options (530).

The process 500 includes the step of determining a weighted value for each of the component stock options, as the component stock options correspond to options for component stocks of the stock market index (510). The weighted value for each of the component stock options is computed by multiplying the weighting value corresponding to the component stock option by the square of the component stock option volatility. The weighting value of each of the component stock options describes the contribution of each component stock option in the makeup of the stock market index. As an example, the weighting value describes the market capitalization of the component stock option relative to the basket portfolio (e.g., the other component stock options) market capitalization.

The component stock option volatility describes a fluctuation (e.g., dispersion) in the price of the option for the component stock, e.g., the standard deviation of the returns for the option. The square of the component stock option volatility describes the variance of the component stock option e.g., as performed according to the VIX methodology referenced in FIG. 4. The weighted value for each of the component stock options may be determined by other methods e.g., iterative search and back-solving with the historical volatility.

The process 500 includes the step of determining a sum of the weighted values, the weighted values corresponding to the component stock options (520). The sum of the weighted values describes a measure of the total correlation of the index, with the weight of each component stock option describing the respective component stock option relative to the all of the component stock options for the stock market index. The sum of the total weighted values describes a total implied correlation of the stock market index.

The process 500 includes the step of subtracting a square of the stock market index option volatility from the sum of the weighted values for the component stock options (530). The stock market index option volatility describes a fluctuation (e.g., dispersion) in the price of the stock market index option, e.g., the standard deviation of the returns for the stock market index. The square of the stock market index option volatility describes the variance of the stock market index e.g., as performed in the VIX methodology referenced in FIG. 4. The square of the volatility for the stock market index describes the actualized correlation of the stock market index. By subtracting the sum of weighted values from the square of the volatility for the stock market index, an implied dispersion index value is generated to measure the expected spread between the implied and realized correlation of the stock market index.

As a particular example, a method for computing the implied dispersion index value using variance replication includes:

$$\text{Implied Dispersion Index Value} = \sum_{i=1}^{N} w_i VIX_i^2 - VIX_{SPX}^2$$

Where N is the number of component stock options, corresponding to the number of component stocks of the stock market index, $w_i$ is the $i^{th}$ weighted value corresponding to the $i^{th}$ component stock option, $VIX_i$ is the $i^{th}$ component stock option volatility, and $VIX_{SPX}$ is the stock market index option volatility.

Figure 6:
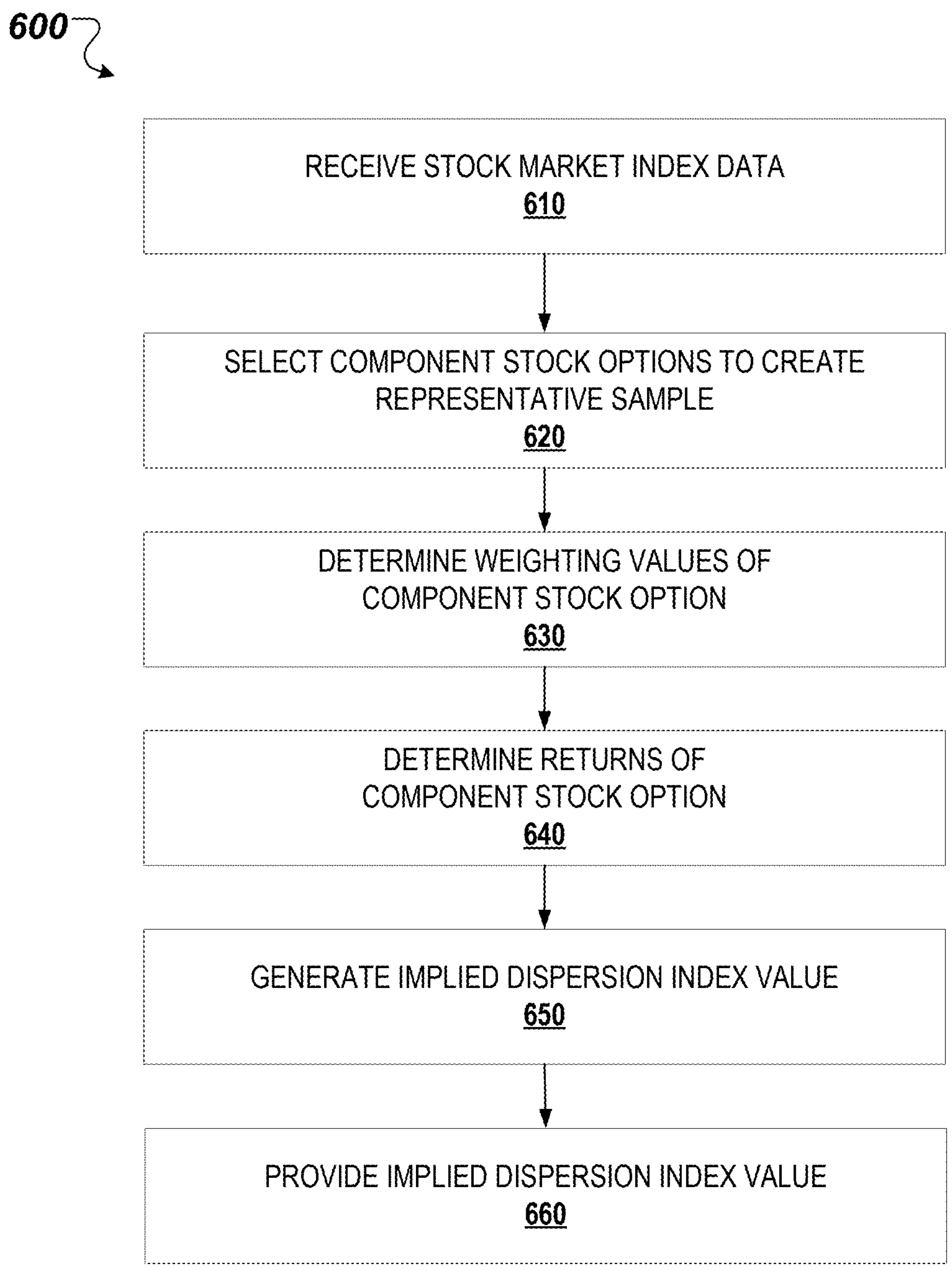
FIG. 6 is a flowchart of an example process for generating and disseminating an implied dispersion index value using absolute returns.

FIG. 6 is a flowchart of an exemplary process 600 for generating and providing an implied dispersion index value, by using the absolute returns of component stocks options corresponding to component stocks of a stock market index. Briefly, the process 600 includes the steps of receiving data related to a stock market index (610), selecting one or more component stock options to represent the stock market index (620), determining a weighting value for each of the component stock options (630), determining a return for each of the component stock options (640), generating the implied dispersion index value (650), and providing the implied dispersion index value (660).

In more detail, the process 600 includes the step of receiving data related to a stock market index (610). For example, the exchange computer system 110 may receive data related to the Standard and Poor's 500 index from a remote computing device associated with one of the brokers/market makers 122, by a network 114. In some examples, the data related to the stock market index is co-located with exchange computer system 110, but can also be provided by other exchanges 112. The data related to the stock market index may include classes of component stocks (e.g., financial instruments) that make up the stock market index and market conditions related to the classes of component stocks (e.g., average daily volume, national best bid and offer, strike price, premiums, contract sizes, expiration dates).

The process 600 includes the step of selecting one or more component stock options from the stock market index to provide a representative sample of the stock market index (620). The component stocks corresponding to the component stock options may be selected based on market capitalization of the component stock relative to the stock market index (e.g., large-cap, small-cap). In some examples, the component stocks corresponding to the component stock options may be selected based on multiple market conditions and characteristics, such as an amount of time the component stock has been listed on the stock market index and liquidity metrics (e.g., working capital ratio, average daily volume, bid-ask spread). The component stocks corresponding to the component stock options can also be selected based on the return of the component stock (e.g., above or below a threshold value, between two threshold values) in the stock market index. Additionally, the exchange computer system 110 can implement rules from database 138 including selecting stocks based on liquidity class, availability of liquid call-put options pairs, and exclusion of pre-specified restricted securities. In some examples, the database 138 includes algorithms to select the component stocks for corresponding component stock options.

The process 600 includes the step of determining a weighting value for each of the component stock options (630). The weighting value for each of the component stock options can be a value determined by the index engine 136 of the exchange computer system 110. Further discussion of the index engine 136 determining the weight corresponding to each component stock option is referenced in FIG. 4, but other example methods may be utilized for computing weights. The weight of each of the component stock options describes the contribution (e.g., a representation) of each component stock option in the makeup of the stock market index.

The process 600 includes the step of determining a return for each component stock option of the stock market index (640). The return for each component stock options of the stock market index may depend if the component stock option is a call (e.g., a right to buy) or a put (e.g., a right to sell) for an underlying financial instrument of the component stock option at a strike price by an expiration date. In addition to the strike price of the component stock options, a spot price (e.g., current market price) and a premium (e.g., a market price of a contract order) may be used to compute the return. For example, the return of a call of the component stock option may be calculated by subtracting the strike price and a premium of the component stock option from the spot price. The return of a put of the component stock option may be calculated by subtracting the spot price and the premium of the component stock option from the strike price. The return determined for each component stock option may include processing historical, realized returns for each component stock in the stock market index. In some examples, processing returns may require processing received data by the exchange computer system 110 in step 610 over a historical period of time by the index engine 136 to compute one or more values for implied (e.g., predicted) returns of the component stock option.

The process 600 includes the step of generating the implied dispersion index value (650). The implied dispersion index value is based on the weighting value determined for each of the component stock options in step 630 and the return determined for each of the component stock options in step 640. The index engine 136 of the exchange computer system 110 determines the implied dispersion index value. Further discussion of the index engine 136 determining implied dispersion index by absolute returns is referenced in FIG. 7, but other example techniques (e.g., implied volatility) may be used for generating the implied dispersion index value.

The process 600 includes the step of providing the implied dispersion index value (660). For example, the implied dispersion index value may be provided to brokers/market makers 122 and other exchanges 112 by the network 114 and the exchange computer system 110. The implied dispersion index may be disseminated to one or more remotely located device (e.g., user devices 116, 118, and 120) or co-located devices e.g., a graphical user interface on a display (e.g., panel 320 on user device 310 in FIG. 3) by the network 114 from the exchange computer system 110.

Figure 7:
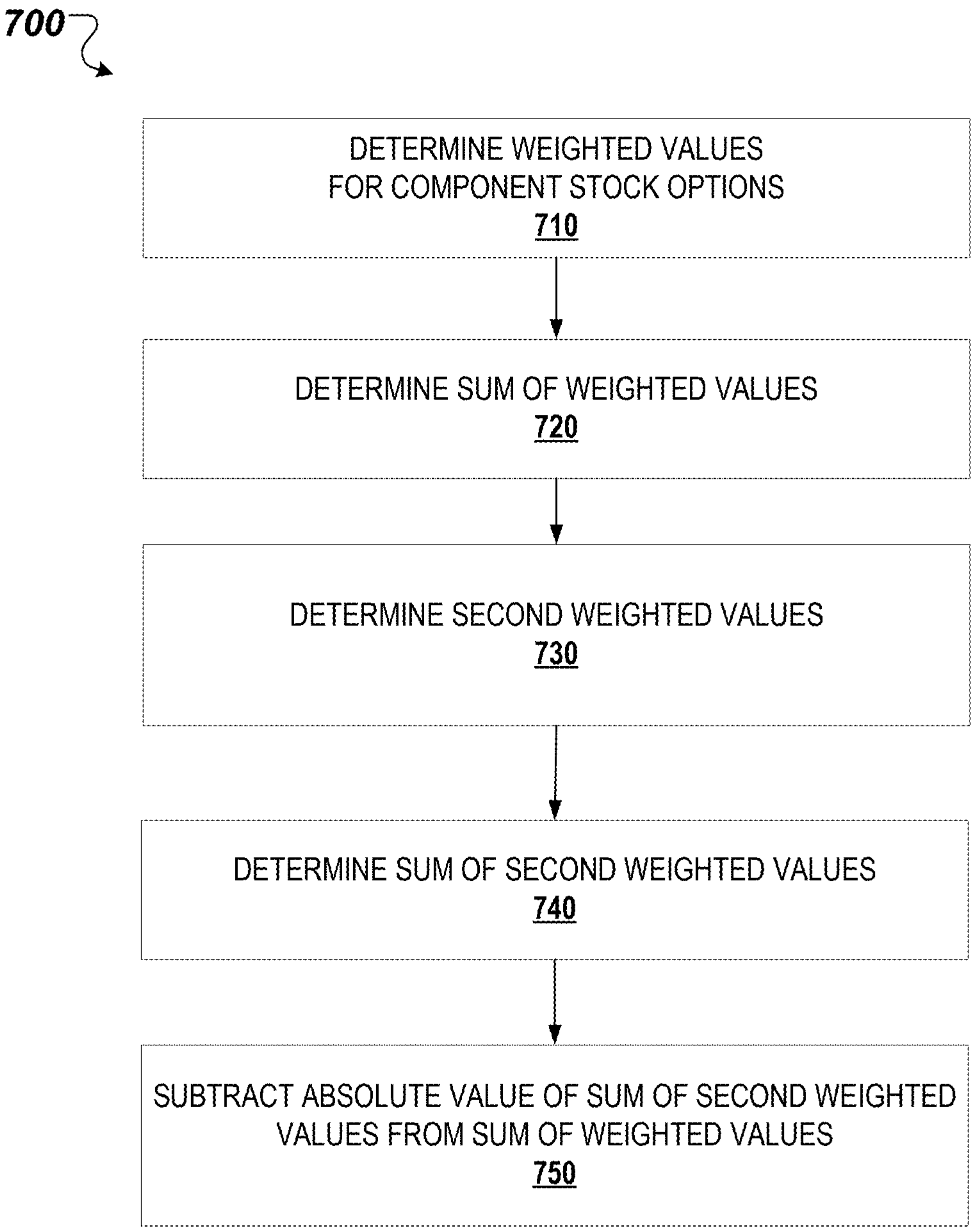
FIG. 7 is a flowchart of an additional example process for generating an implied dispersion index value using absolute returns.

FIG. 7 is a flowchart of an exemplary process 700 for computing an implied dispersion index value of a stock market index, using the absolute returns of options for a stock market index and its corresponding component stocks. Briefly, the process 700 includes the steps of determining a weighted value for each of the component stock options (710), determining a sum of the weighted values (720), determining a second weighted value for each of the component stock options (730), determining a sum of the second weighted values (740), and subtracting an absolute value of the sum of the second weighted values from the sum of the weighted values (750).

The process 700 includes the step of determining a weighted value for each of the component stock options, as the component stock options correspond to options for component stocks of the stock market index (710). Each weighted value is computed by multiplying the weighting value corresponding to the component stock option by an absolute value of the return (e.g., the absolute value of the return is positive) of the component stock option. The weighting value of each of the component stock options describes the contribution of each component stock option in the makeup of the stock market index.

The process 700 includes the step of determining a sum of the weighted values, the weighted values corresponding to the component stock options (720). The sum of the weighted values describes a measure of the total correlation of the index, with the weight of each component stock option describing the respective component stock option relative to the all of the component stock options for the stock market index. The sum of weighted values, derived from multiplying weighting values of component stock options with absolute value of the return of the component stock options, describes a total implied correlation of the stock market index The process 700 includes the step of determining a second weighted value for each of the component stock options (730). Each of the second weighted values are computed by multiplying the weighting value corresponding the component stock option by return (e.g., a value) corresponding to the component stock option. The return describes a profit, loss, or break-even (e.g., net change between a strike price and a spot price for the component stock option) corresponding to the component stock option.

The process 700 includes the step of determining a sum of the second weighted values, the second weighted values corresponding to the component stock options (740). The sum of the second weighted values describes a measure of the total correlation of the index, with the weight of each component stock option describing the respective component stock option relative to the all of the component stock options for the stock market index. The sum of the total weighted values describes a total implied correlation of the stock market index, based on the total returns of the stock market index.

The process 700 includes the step of subtracting an absolute value of the sum of the second weighted values from the sum of weighted values (750). The absolute value of the sum of the second weighted values describes the implied correlation of the stock market index, while the sum of weighted values describe the realized correlation of the stock market index. By subtracting the absolute value of the second sum of weighted values from the sum of weighted values for the stock market index, an implied dispersion index value is generated to measure the expected spread between the implied and realized correlations of the stock market index.

As a particular example, a method for computing the implied dispersion index value using absolute returns includes:

$$\text{Implied Dispersion Index Value} = \sum_{i=1}^{N} w_i |r_i| - \left| \sum_{i=1}^{N} w_i r_i \right|$$

Where N is the number of component stock options, corresponding to the number of component stocks of the stock market index, $w_i$ is the $i^{th}$ weighted value corresponding to the $i^{th}$ component stock option, $r_i$ is the return of the $i^{th}$ component stock option.

Implementations have been described, but other implementations are within the scope of the following claims.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, in some implementations of FIG. 4, step 440 may be performed before or at the same time as step 430, and step 450 may be performed before or at the same time as action 420. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An exchange computer system comprising:

an order entry port configured to receive one or more orders associated with a particular index from a computer network;

an order routing system configured to route the one or more orders according to a respective destination associated with the one or more orders; and an index engine comprising a first index engine processor configured to operate in a parallel processing mode in which the index engine is configured to operate in parallel with the order routing system and the order entry port, the index engine configured to store index engine logic comprising machine language instructions that when executed by the first index engine processor in the parallel processing mode, cause the index engine to perform operations comprising:

selecting, based on the one or more orders associated with the particular index and for a particular period of time, a subset of instruments comprising a plurality of component instruments from the particular index;

obtaining, through the computer network communicatively coupled to the index engine, volatility data for the subset of instruments;

generating, for the particular period of time and from (i) the one or more orders associated with the particular index and (ii) the volatility data, dispersion index data based on a weighting value for each of the plurality of component instruments, and a component instrument volatility for each of the plurality of component instruments; and transmitting the dispersion index data to a plurality of user computing devices that are connected to the exchange computer system via the computer network.

2. The exchange computer system of claim 1, further comprising:

an order book configured to disseminate information related to orders of the exchange computer system; and an order matching system communicatively coupled to the order book and the index engine, the order matching system comprising at least one first processor and configured to determine that a second order from the orders of the order book matches an order for a financial instrument corresponding to a dispersion index from the dispersion index data, wherein the first index engine processor of the index engine configures the at least one first processor according to the index engine logic to operate in the parallel processing mode and match the second order to the order based on the dispersion index data.

3. The exchange computer system of claim 2, wherein the order routing system comprises at least one second processor is communicatively coupled to the index engine, wherein the order routing system is configured by the first index engine processor to operate in the parallel processing mode to:

route orders for financial instruments to one or more destinations of the exchange computer system; and execute the order using the second order, wherein the index engine configures the at least one second processor of the order routing system according to the index engine logic to route the order to a destination associated with the second order.

4. The exchange computer system of claim 1, wherein generating the dispersion index data comprises filtering, according to the particular period of time, data related to the particular index.

5. The exchange computer system of claim 1, wherein:

the dispersion index data is securely transmitted to the plurality of user computing devices based at least in part on a distribution list; and the exchange computer system comprises a transceiver having one or more input/output ports connected to the computer network.

6. The exchange computer system of claim 2, wherein the exchange computer system is a distributed computer system comprising at least one communication interface;

the index engine;

the order entry port, wherein the order entry port is configured to receive, from a user computer device included in the plurality of user computing devices, an order for a financial instrument corresponding to the dispersion index, wherein data related to the order was provided by a user through a graphical user interface of an application of the user computer device;

the order routing system; and the order matching system.

7. The exchange computer system of claim 1, wherein the operations further comprise:

determining a weighting value for each of the plurality of component instruments for the particular index;

determining, from volatility data for the subset of instruments, a component instrument volatility for each of the plurality of component instruments; and determining, from the volatility data, an index volatility for an instrument associated with the particular index.

8. The exchange computer system of claim 1, wherein the plurality of user computing devices are configured to display the dispersion index data within a graphical user interface of an application that facilitates real-time trading, through the exchange computer system, of financial instruments related to a dispersion index for the dispersion index data.

9. The exchange computer system of claim 1, wherein:

the dispersion index data comprises a dispersion index value, and the dispersion index value provides an option-based measure of market expectation of relative spread between implied and realized correlation.

10. A method for generating and disseminating dispersion index data implemented via an exchange computer system, the method comprising:

receiving, by an order entry port and from a computing device connected to the exchange computer system via a computer network, one or more orders associated with a particular index, wherein the exchange computer system comprises an order routing system configured to route the one or more orders according to a respective destination associated with the one or more orders;

selecting, by an index engine of the exchange computer system and for a particular period of time, a subset of instruments comprising a plurality of component instruments from the particular index, wherein the selecting is based on the one or more orders, wherein the index engine comprises a first index engine processor configured to operate in a parallel processing mode in which the index engine is configured to operate in parallel with the order routing system and the order entry port;

obtaining, by the computer network communicatively coupled to the index engine, volatility data for the subset of instruments;

generating, by the index engine, for the particular period of time and from the volatility data, the dispersion index data based on a weighting value for each of the plurality of component instruments, and a component instrument volatility for each of the plurality of component instruments; and transmitting, by the exchange computer system, the dispersion index data to a plurality of user computing devices that are connected to the exchange computer system via the computer network.

11. The method of claim 10, further comprising:

receiving, from a user device included in the plurality of user computing devices that are connected to the exchange computer system via the computer network and through the order entry port, data related to an order for an instrument in an order book of the exchange computer system, wherein the order for the instrument corresponds to a dispersion index from the dispersion index data, and wherein the first index engine processor of the index engine configures the order entry port to receive data related to orders for matching and routing by the exchange computer system;

determining, by an order matching system coupled to the index engine and the order book, that a second order from orders in the order book matches the order for the instrument corresponding to the dispersion index, wherein the order matching system comprises at least one first processor and wherein the first index engine processor of the index engine configures the at least one first processor according to index engine logic to operate in the parallel processing mode and match the second order to the order based on the data related to the dispersion index; and executing, by an order routing system comprising at least one second processor and communicatively coupled to the index engine, the order using the second order, wherein the first index engine processor of the index engine configures the at least one second processor of the order routing system to operate in the parallel processing mode to route the order to a destination associated with the second order.

12. The method of claim 10, wherein generating the dispersion index data comprises:

determining, for each of the plurality of component instruments, a weighted value by multiplying the weighting value corresponding to the component instrument by a square of the component instrument volatility corresponding to the component instrument;

determining a sum of the weighted values; and subtracting a square of volatility for an instrument corresponding to the particular index from the sum of the weighted values.

13. The method of claim 10, wherein the plurality of component instruments are selected such that every stock corresponding a component instrument has been listed on the particular index for at least a threshold period of time, such that every asset corresponding to a component instrument has a liquidity metric exceeding a liquidity threshold, and such that every asset corresponding to a component instrument has a volatility between a first threshold and a second threshold.

14. The method of claim 11, wherein the order book is a trade at settlement order book, and wherein a transaction price of the order is determined based on a daily settlement price of the dispersion index.

15. The method of claim 11, wherein the order is a market order and the instrument corresponding to the dispersion index is a dispersion index futures contract.

16. The method of claim 11, further comprising settling the instrument corresponding to the dispersion index data by providing an owner of the instrument with a strip of options corresponding to the plurality of component instruments and to an index instrument for the particular index.

17. The method of claim 10, wherein:

the particular index is Standard and Poor's 500 Index, a volatility for the particular index is determined based on a volatility index methodology, the subset of instruments are a subset of component stock options, and the plurality of component instruments are a plurality of component stock options for the particular index.

18. A method for generating and disseminating dispersion index data implemented via an exchange computer system, the method comprising:

receiving, by an order entry port and a computing device connected to the exchange computer system via a computer network, one or more orders associated with a particular index, wherein the exchange computer system comprises an order routing system configured to route the one or more orders according to a respective destination associated with the one or more orders;

selecting, by an index engine of the exchange computer system and for a particular period of time, a subset of instruments comprising a plurality of component stock options-instruments from the particular index, wherein the selecting is based on the one or more orders, wherein the index engine comprises a first index engine processor configured to operate in a parallel processing mode in which the index engine is configured to operate in parallel with the order routing system and the order entry port;

obtaining, by the computer network communicatively coupled to the index engine, return data for the subset of instruments;

generating, by the index engine, for the particular period of time and from the return data, the dispersion index data based on a weighting value of each of the plurality of component instruments and a return of each of the plurality of component instruments from the return data; and transmitting, by the exchange computer system, the dispersion index data to a plurality of user computing devices that are connected to the exchange computer system via the computer network.

19. The method of claim 18, further comprising:

receiving, from a user device included in the plurality of user computing devices that are connected to the exchange computer system via the computer network and through the order entry port, data related to an order for an instrument in an order book of the exchange computer system, wherein the order for the instrument corresponds to a dispersion index from the dispersion index data, and wherein the first index engine processor of the index engine configures the order entry port to receive data related to orders for matching and routing by the exchange computer system;

determining, by an order matching system coupled to the index engine and the order book, that a second order from orders in the order book matches the order for the instrument corresponding to the dispersion index, wherein the order matching system comprises at least one first processor and wherein the first index engine processor of the index engine configures the at least one first processor according to index engine logic to operate in the parallel processing mode and match the second order to the order based on the data related to the dispersion index; and executing, by an order routing system comprising at least one second processor and communicatively coupled to the index engine, the order using the second order, wherein the first index engine processor of the index engine configures the at least one second processor of the order routing system to operate in the parallel processing mode to route the order to a destination associated with the second order.

20. The method of claim 18, wherein generating the dispersion index data comprises:

determining, for each of the plurality of component instruments, a weighted value by multiplying the weighting value corresponding to the component instrument by an absolute value of the return corresponding to the component instrument;

determining a sum of the weighted values;

determining, for each of the plurality of component instruments, a second weighted value by multiplying the weighting value corresponding to the component instrument by the return corresponding to the component instrument;

determining a sum of the second weighted values; and subtracting an absolute value of the sum of the second weighted values from the sum of the weighted values.

* * * * *